Figure 1:
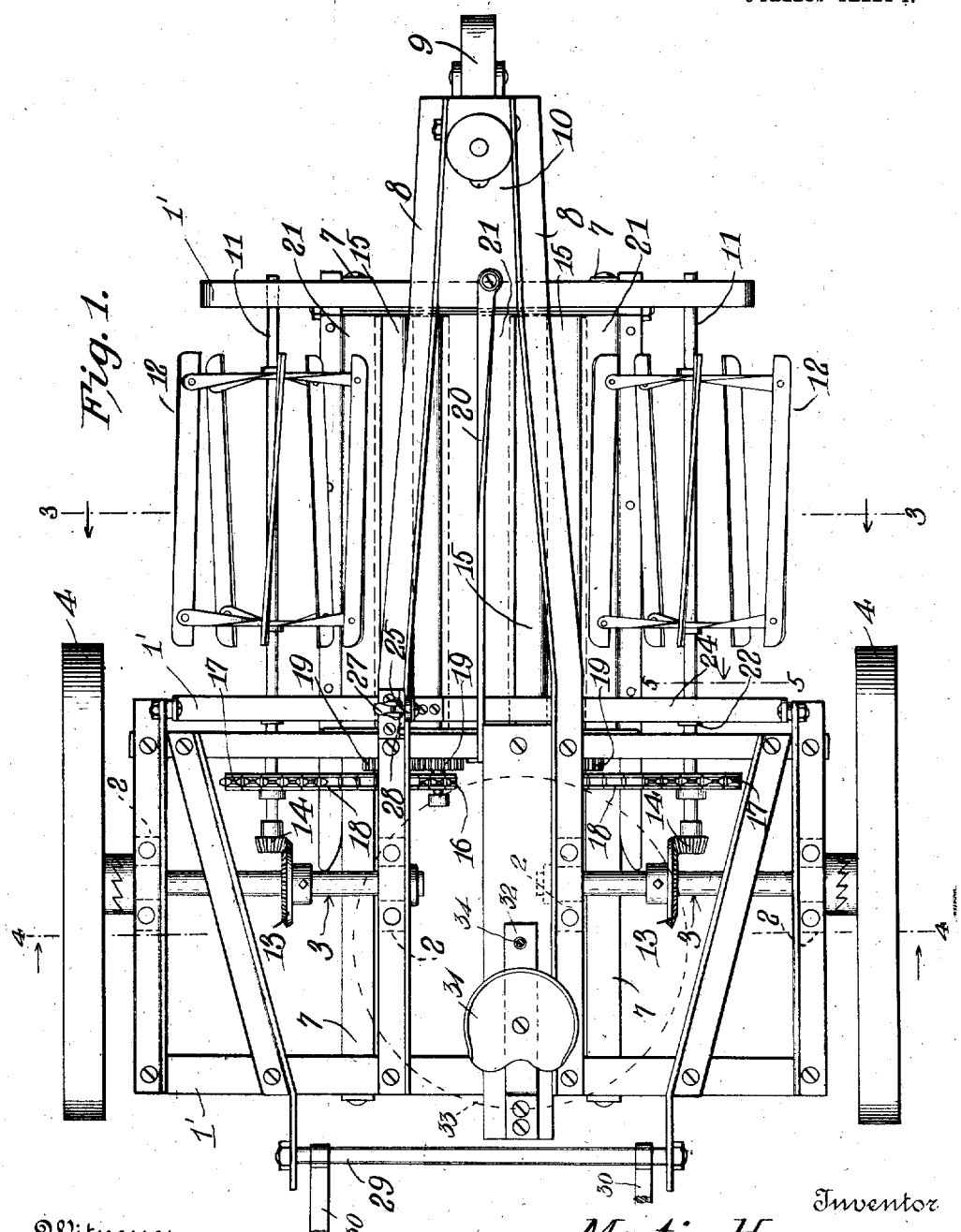

No. 890,051. PATENTED JUNE 9, 1908.
M. HARMON.
POTATO BUGGING MACHINE.
APPLICATION FILED FEB. 3, 1908.

3 SHEETS—SHEET 1.

Witnesses
C. E. Smith.
C. H. Griesbauer.

Inventor
Martin Harmon.
By H. B. Willson & Co.
Attorneys

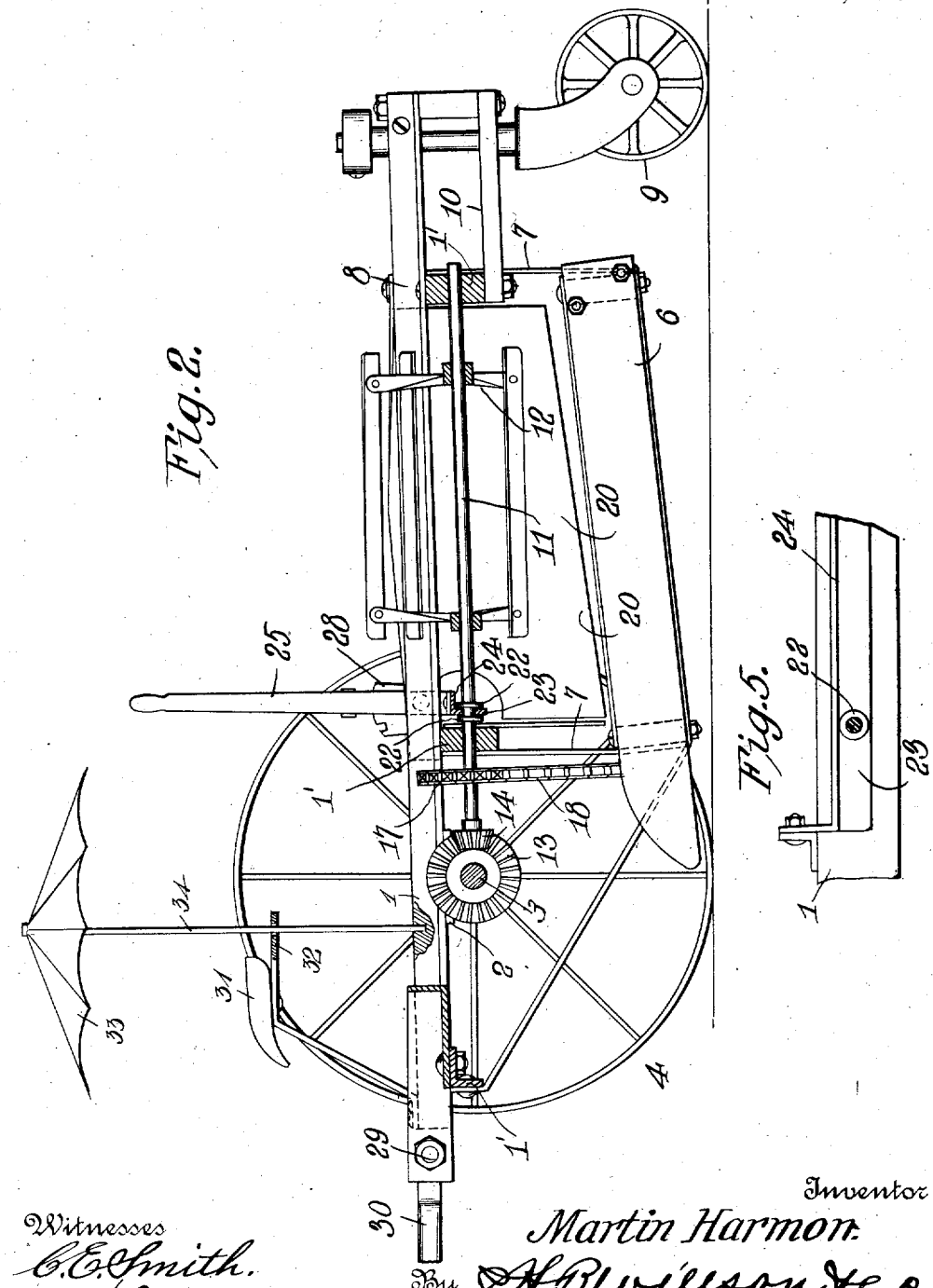

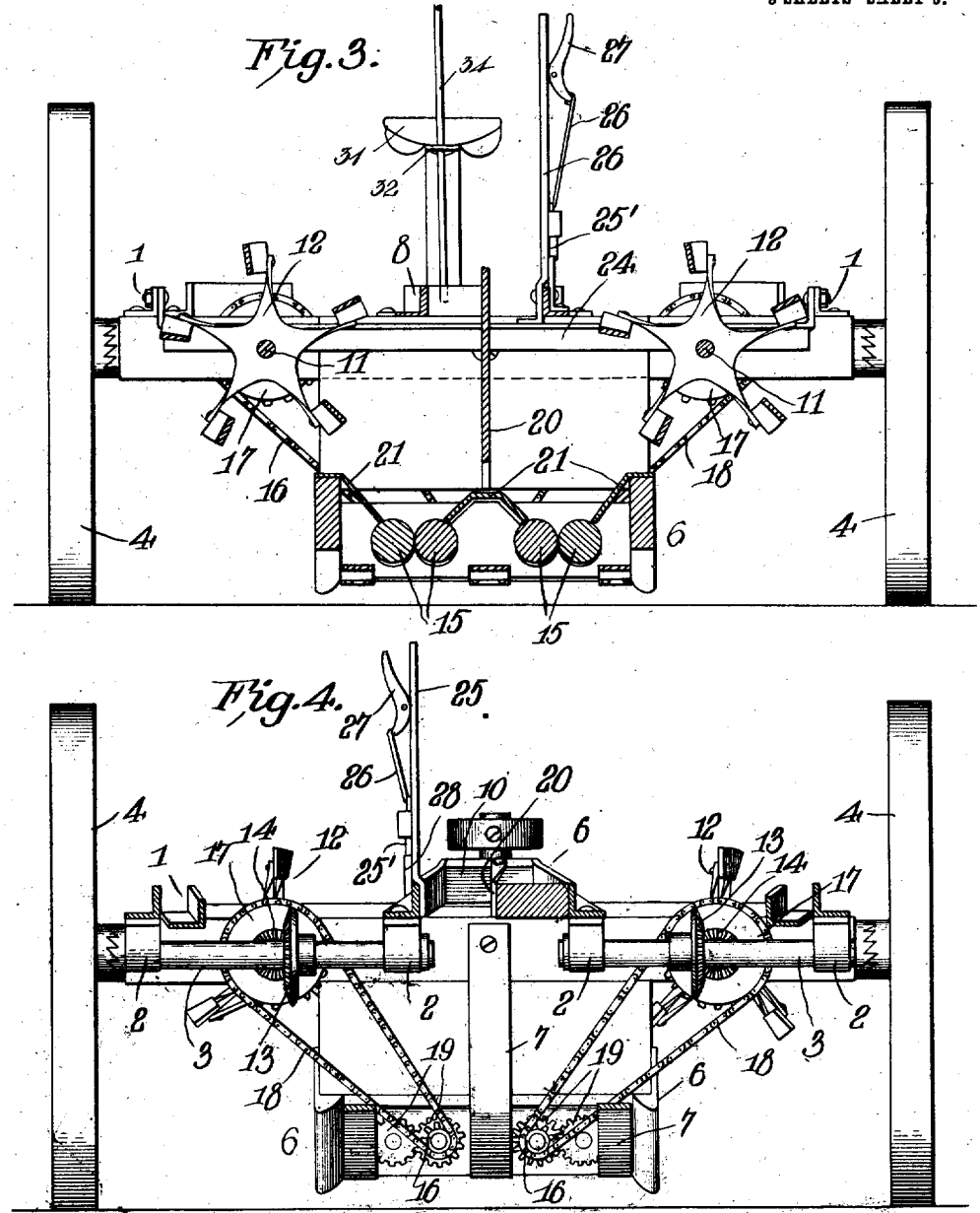

UNITED STATES PATENT OFFICE.

MARTIN HARMON, OF BLOOMINGTON, ILLINOIS.

POTATO-BUGGING MACHINE.

No. 890,051. Specification of Letters Patent. Patented June 9, 1908.

Application filed February 3, 1908. Serial No. 414,075.

*To all whom it may concern:*

Be it known that I, MARTIN HARMON, a citizen of the United States, residing at Bloomington, in the county of McLean and State of Illinois, have invented certain new and useful improvements in Potato-Bugging Machines; and I do declare the following to be a full, clear, and exact description of the invention, such as will enable others skilled in the art to which it appertains to make and use the same.

This invention relates to new and useful improvements in potato bug machines, for knocking potato bugs from the vines and destroying the same, and is especially designed as an improvement over the machine for which Letters-Patent were granted March 29, 1904, No. 755,769.

The object of the invention is to provide a simple, cheap, durable and efficient machine which is adapted to be driven astride the rows of potato plants and to knock the potato bugs, chick bugs, or other vermin from the vines and destroy the same while the machine is in motion.

In the accompanying drawings,—Figure 1 is a top plan view of a potato bug destroying machine embodying my improvements; Fig. 2 is a longitudinal sectional view of the same; Fig. 3 is a cross sectional view taken on the plane indicated by the dotted lines 3—3 of Fig. 1; Fig. 4 is a similar view taken on the line 4—4 of Fig. 1; and Fig. 5 is a fragmentary sectional view of a portion of the mechanism for throwing the machine into and out of gear.

In the embodiment of my invention, here shown, I provide a main rectangular supporting frame 1 comprising cross pieces 1' rigidly connected by a number of longitudinally extending connecting bars 8, which extend the full length of the frame, the front end of the frame being provided with suitable bearings 2 for the main shaft or axle, which, as here shown, is made in two sections 3. A roller carrying frame 6 is supported below the rear end of the main supporting frame by hangers 7. A train wheel 9 is supported in the rear of the main supporting frame by a suitable bracket 10 extending rearwardly from the rear cross piece of said frame. A longitudinally extending shaft 11 is arranged at each side of the machine and extends through the rear and central cross pieces 1' thereof to a point adjacent to the adjacent axle section. Each of these shafts carries a fan 12, preferably such as are here shown, said fans being disposed at an appropriate height to operate on the vines as the machine passes them, so that by their rotation the vines will be so agitated as to shake the bugs therefrom, and to sweep the bugs inwardly so that they are caused to fall upon the frame 6, which is between and below said fans. Shafts 11 are driven from the main shaft or axle sections 3 by beveled gears 13, fixed to said sections and being adapted to intermesh with beveled pinions 14, fixed to the extreme front ends of said shafts.

Within the scope of my invention, any suitable means may be employed and carried in the roller carrying frame to receive the bugs and enable them to be destroyed *en masse*. As shown, however, I preferably use two series of crushing rollers 15, each series being arranged near one side of the frame, and being journaled in suitable bearings of the same.

In practice, the front ends of the crushing rollers extend to a point in advance of the front cross piece of the frame 6, and one roller of each series is provided with a suitable sprocket wheel 16, over which and a sprocket wheel 17, fixed to the front end of each of the shafts 11 is arranged to work an endless chain 18. Each of the crushing rollers is provided at its front end with a pinion 19, so that all of the rollers of each series are caused to turn in relatively opposite directions by movement being imparted to one roller of each series by the sprocket and chain connections described.

A vertical wall or partition 20 is arranged above the frame 6 and between the two series of rollers, the purpose of which will be evident. Suitable scraper members 21 are arranged above the rollers 15 to scrape the crushed bugs therefrom.

While various arrangements may be employed for throwing the machine into and out of gear, I have shown and described an arrangement that is preferably employed. Each of the shafts 10 is provided at a point slightly in rear of the central cross piece of the frame 1 with two spaced collars or shoulders 22, between which is arranged the depending portion or member 23 of a transversely extending rock bar in the form of an angle bar 24, said depending portion or member being recessed to receive the shafts.

An operating lever 25 is mounted on the top piece of the angle bar and is pivoted near its inner end above the frame in any suitable manner. This operating lever is provided with the usual spring actuated pawl, connecting rod and grip, 25, 26, and 27, respectively, the first named of which is adapted to engage in either of the notches of a segmental rack 28, mounted above the machine frame in any suitable manner. By this arrangement the beveled pinions 14 of the shafts 11 may be thrown into and out of engagement or mesh with the beveled gears 13 of the shaft or axle sections 3 by manipulation of the operating member, as will be obvious.

A connecting rod or member 29 is arranged at a suitable point in advance of the frame 1 to which is connected the draft means 30. A seat 31, provided with the usual seat supporting bar 32 is mounted on the front end of the machine, a suitable canopy 33 being arranged directly over the seat to protect the driver, the upright support 34 for the canopy preferably extending through a corresponding aperture in the rear projecting end of the seat and being supported by the machine frame.

From the construction disclosed it will be seen that the entire bug destroying mechanism may be thrown into or out of gear by a single operation, and that the bugs knocked from the vines by one of the drum fans will be deflected onto the series of crushing rollers adjacent thereto. It will also be seen that by employing only two series of crushing rollers and arranging the scraper members, and a partition or fender in the manner shown, liability of any of the bugs passing between the series of rollers will be entirely obviated.

Having described my invention, I claim:

A machine of the character specified, embracing in combination with a supporting frame, a main axle made in two sections arranged at the front end of the supporting frame, and supporting wheels fixed to the ends of said axle sections, of a roller carrying frame arranged under the supporting frame, two or more series of crushing rollers arranged in said roller carrying frame, longitudinal rearwardly extending shafts journaled to the supporting frame at opposite sides of the roller carrying frame, drum fans fixed to said shafts, scraper members secured to the roller carrying frame above and in position to engage the crushing rollers, suitable gearing for driving the fan shafts and crushing rollers from the main axle, and manually operating means for throwing such gearing into and out of gear.

In testimony whereof I have hereunto set my hand in presence of two subscribing witnesses.

MARTIN HARMON.

Witnesses:
FRANK PENNER,
CLAUDE E. MCLEAN.